(12) United States Patent
Higuchi et al.

(10) Patent No.: US 7,667,147 B2
(45) Date of Patent: Feb. 23, 2010

(54) CONTROLLER FOR A COMBINATION WEIGHER

(75) Inventors: Hiroshi Higuchi, Takasago (JP); Shozo Kawanishi, Nishinomiya (JP); Taketoshi Okamura, Ashiya (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 82 days.

(21) Appl. No.: 11/720,073

(22) PCT Filed: Nov. 10, 2005

(86) PCT No.: PCT/JP2005/020563

§ 371 (c)(1), (2), (4) Date: Dec. 5, 2007

(87) PCT Pub. No.: WO2006/057165

PCT Pub. Date: Jun. 1, 2006

(65) Prior Publication Data

US 2008/0190671 A1 Aug. 14, 2008

(30) Foreign Application Priority Data

Nov. 25, 2004 (JP) ............................. 2004-339920

(51) Int. Cl.
*G01G 19/387* (2006.01)
(52) U.S. Cl. .................................. 177/25.18
(58) Field of Classification Search ............... 177/25.18
See application file for complete search history.

(56) References Cited

U.S. PATENT DOCUMENTS 4,967,856 A * 11/1990 Kawanishi et al. ....... 177/25.18

2008/0245578 A1 * 10/2008 Kawanishi et al. ....... 177/25.11

FOREIGN PATENT DOCUMENTS

| EP | 1832856 | * | 9/2007 |
| JP | 60-211319 | | 10/1985 |
| JP | 63-168516 | | 7/1988 |
| JP | 04-118528 A | | 4/1992 |
| JP | 4-212024 | | 8/1992 |

OTHER PUBLICATIONS

International Search Report for PCT/JP2005/020563, dated Nov. 30, 2005.

* cited by examiner

*Primary Examiner*—Randy W Gibson
(74) *Attorney, Agent, or Firm*—Marshall, Gerstein & Borun LLP

(57) ABSTRACT

A combination weigher of the present invention comprises a plurality of weighing hoppers (4) each of which includes two weighing chambers (4*a*, 4*b*) and is capable of weighing objects to be weighed which have been fed to the two weighing chambers, the weighing chambers being capable of independently discharging the objects to be weighed; a plurality of feeding hoppers (3) which are disposed above the weighing hoppers to respectively correspond to the weighing hoppers, for selectively feeding the objects to be weighed to each of the two weighing chambers of the corresponding weighing hopper; and a control unit (10) which is configured to perform combination calculation based on weight of the objects to be weighed which have been fed into the weighing chambers of each of the weighing hoppers (4) to select weighing chambers (4*a*, 4*b*) forming a combination which have been fed with the objects to be weighed whose total weight falls within a predetermined weight range, and is configured to cause the selected weighing chambers to discharge therefrom the objects to be weighed; and the control unit (10) is configured to perform the combination calculation in such a way that the number of weighing hoppers whose weighing chambers (4*a*, 4*b*) are both selected simultaneously to form the combination is limited to a predetermined number or less.

1 Claim, 3 Drawing Sheets

(UNIT: g)

| NUMBER OF EQUIPPED WEIGHING HOPPERS | NUMBER OF HOPPERS WHOSE CHAMBERS MAY BE BOTH SELECTED SIMULTANEOUSLY ZERO | | NUMBER OF HOPPERS WHOSE CHAMBERS MAY BE BOTH SELECTED SIMULTANEOUSLY ONE | | NO LIMITATION |
|---|---|---|---|---|---|
| | AVERAGE WEIGHT | DIFFERENCE WITH NO LIMITATION | AVERAGE WEIGHT | DIFFERENCE WITH NO LIMITATION | AVERAGE WEIGHT |
| 4 | 1024.38 | −0.15 | 1022.33 | 1.90 | 1024.23 |
| 5 | 1005.18 | −1.43 | 1003.70 | 0.05 | 1003.75 |
| 6 | 1001.50 | −0.28 | 1001.20 | 0.02 | 1001.22 |
| 7 | 1000.74 | −0.14 | 1000.60 | 0.00 | 1000.60 |
| 8 | 1000.42 | −0.06 | 1000.35 | 0.01 | 1000.36 |
| 9 | 1000.28 | −0.05 | 1000.23 | 0.00 | 1000.23 |

| NUMBER OF EQUIPPED WEIGHING HOPPERS | NUMBER OF HOPPERS WHOSE CHAMBERS MAY BE BOTH SELECTED SIMULTANEOUSLY ZERO | | NUMBER OF HOPPERS WHOSE CHAMBERS MAY BE BOTH SELECTED SIMULTANEOUSLY ONE | | NO LIMITATION (UNIT: g) |
|---|---|---|---|---|---|
| | AVERAGE WEIGHT | DIFFERENCE WITH NO LIMITATION | AVERAGE WEIGHT | DIFFERENCE WITH NO LIMITATION | AVERAGE WEIGHT |
| 4 | 1024.38 | −0.15 | 1022.33 | 1.90 | 1024.23 |
| 5 | 1005.18 | −1.43 | 1003.70 | 0.05 | 1003.75 |
| 6 | 1001.50 | −0.28 | 1001.20 | 0.02 | 1001.22 |
| 7 | 1000.74 | −0.14 | 1000.60 | 0.00 | 1000.60 |
| 8 | 1000.42 | −0.06 | 1000.35 | 0.01 | 1000.36 |
| 9 | 1000.28 | −0.05 | 1000.23 | 0.00 | 1000.23 |

FIG. 3

CONTROLLER FOR A COMBINATION WEIGHER

TECHNICAL FIELD

The present invention relates to a combination weigher comprising a plurality of weighing hoppers each including two weighing chambers.

BACKGROUND ART

One example of a conventional combination weigher for weighing objects to be weighed, such as detergents and confectionary, comprises weighing hoppers each including two chambers (weighing chambers). By way of example, as shown in FIG. 1, each weighing hopper 4 includes two weighing chambers 4a and 4b which are capable of independently discharging the objects to be weighed. Feeding hoppers 3 are each capable of selectively discharging the objects to be weighed into the weighing chamber 4a or the weighing chamber 4b of the weighing chamber 4 disposed therebelow. In each weighing hopper 4, when the objects to be weighed are fed only to one of the weighing chambers, for example, the weighing chamber 4a, a weight sensor 5 measures a weight of the objects to be weighed inside the weighing chamber 4a, and sends a measured value to a control unit 10. When the objects to be weighed are fed to the other weighing chamber 4b, the weight sensor 5 measures a total weight of the objects to be weighed inside the two weighing chambers 4a and 4b, and sends a measured value to the control unit 10. The control unit 10 calculates the weight of the objects to be weighed inside the weighing chamber 4b by subtracting the weight of the objects to be weighed inside the weighing chamber 4a that has been previously measured, from the total weight of the objects to be weighed inside the two weighing chambers 4a and 4b, and performs combination calculation. The control unit 10 performs the combination calculation based on the weights of the objects to be weighed inside the weighing chambers 4a and 4b of each weighing hopper 4 obtained as described above to determine a combination of the weighing chambers (4a, 4b) which have been fed with the objects to be weighed whose total weight falls within a predetermined weight range. Under control of the control unit 10, the weighing chambers 4a and 4b selected to form the determined combination open their gates to discharge the objects to be weighed onto the collecting chute 6, and the objects to be weighed are accumulated in the collecting hopper 7. Furthermore, the control unit 10 causes the collecting hopper 7 to open its gate to send out the objects to be weighed from inside the collecting hopper 7 to, for example, a packaging machine (not shown).

Since each weighing hopper 4 is thus divided into the two weighing chambers 4a and 4b, five weighing hoppers 4 are needed to achieve performance (weighing precision) substantially equivalent to that of a combination weigher comprising, for example, 10 weighing hoppers which are not divided into two weighing chambers. This makes it possible to decrease the weight sensors 5 which are expensive to half in number.

DISCLOSURE OF THE INVENTION

However, in the above described configuration, if both of the weighing chambers 4a and 4b of a weighing hopper 4 are simultaneously selected to form a combination determined in the combination calculation, then the objects to be weighed are discharged from these weighing chambers 4a and 4b. In this case, since the objects to be weighed are fed from the feeding hopper 3 to only one of the two weighing chambers 4a and 4b before next combination calculation starts, the other of the two weighing chambers 4a and 4b is empty without the objects to be weighed which have been fed from the feeding hopper 3 and thus cannot participate in a combination, in the next combination calculation. This decreases the number of combinations. Subsequently, if one of the weighing chambers which has been fed with the objects to be weighed is selected to form a combination, then one of the weighing chambers 4a and 4b is empty and thus cannot participate in a combination in next combination calculation, decreasing the number of combinations in the same manner. It is well known that weighing precision is increased and reduced according to increase and decrease in the number of combinations. So, the weighing precision will be reduced if the number of combinations decreases as described above.

The disclosed example of the present invention has been developed to solve the above described problem, and a preferred embodiment of the present invention provides a combination weigher comprising weighing hoppers each including two weighing chambers which is capable of increasing weighing precision.

A combination weigher of the present invention comprises a plurality of weighing hoppers each of which includes two weighing chambers, and is capable of weighing objects to be weighed which have been fed to one of the two weighing chambers, the weighing chambers being capable of independently discharging the objects to be weighed; a plurality of feeding means which are disposed above the weighing hoppers to respectively correspond to the weighing hoppers, for selectively feeding the objects to be weighed to each of the two weighing chambers of a corresponding weighing hopper, and a control means which is configured to perform combination calculation based on weight of the objects to be weighed which have been fed into the weighing chambers of each of the weighing hoppers to select the weighing chambers forming a combination which have been fed with the objects to be weighed whose total weight falls within a predetermined weight range, and is configured to cause the selected weighing chambers to discharge therefrom the objects to be weighed; wherein the control means is configured to perform the combination calculation in such a way that the number of weighing hoppers whose weighing chambers are both selected simultaneously to form the combination is limited to a predetermined number or less.

By limiting the number of weighing hoppers whose weighing chambers may be both selected simultaneously to form the combination as described above, weighing precision can be increased.

Also, each of the feeding means may be configured to, when the combination calculation and the discharging of the objects to be weighed are repeated, feed the objects to be weighed to only one of the two weighing chambers of the corresponding weighing hopper in a time period from combination calculation being performed currently to combination calculation being performed next; and wherein the control means may be configured to perform the combination calculation in such a way that the number of weighing hoppers whose weighing chambers are both selected simultaneously to form the combination is limited to one or less.

The disclosed example of the present invention has the above described configuration and can increase the weighing precision in the combination weigher comprising the weighing hoppers each including the two weighing chambers.

The above and further objects and features of the invention will more fully be apparent from the following detailed description with accompanying drawings.

BRIEF DESCRIPTION OF THE DRAWINGS

FIG. 3 is a table showing simulation results in the embodiment of the present invention.

Figure 1:
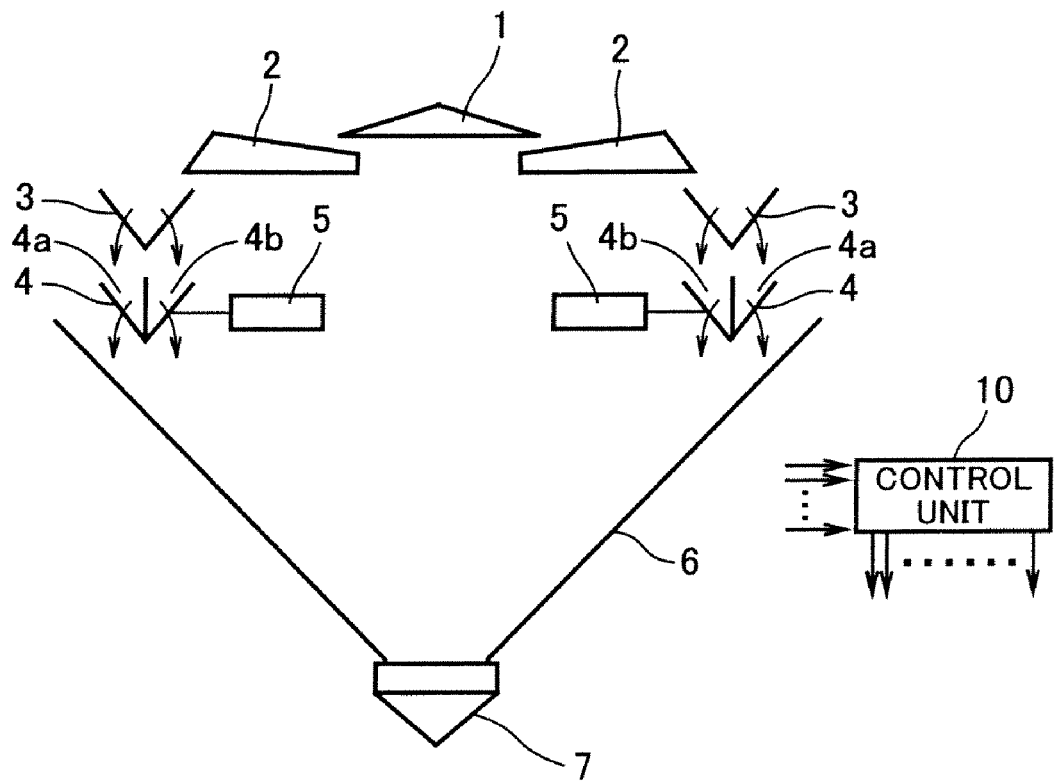
FIG. 1 is a schematic view showing a construction of a combination weigher according to an embodiment of the present invention.

EXPLANATION OF REFERENCE NUMBERS 1. dispersion feeder
2. linear feeder
3. feeding hopper
4. weighing hopper
4a. weighing chamber
4b. weighing chamber
5. weight sensor
6. collecting chute
7. collecting hopper
10. control unit

BEST MODE FOR CARRYING OUT THE INVENTION

Preferred embodiments of the present invention will be described below with reference to the drawings.

FIG. 1 is a schematic view showing a construction of a combination weigher according to an embodiment of the present invention.

The combination weigher, whose operation is entirely controlled by the control unit 10, is provided with the dispersion feeder 1 disposed at the center of an upper part of the combination weigher. The dispersion feeder 1 has a conical shape and serves to radially disperse objects to be weighed supplied from the external supplying device by vibration. Around the dispersion feeder 1, the linear feeders 2 are provided to transfer the objects to be weighed sent from the dispersion feeder 1 into respective feeding hoppers 3 by vibration. The plurality of feeding hoppers 3 and the plurality of weighing hoppers 4 are disposed below the linear feeders 2 and are arranged circularly in such a manner that each feeding hopper 3 and each weighing hopper 4 correspond to the associated one of the linear hopper 2. The collecting chute 6 is disposed below the weighing hoppers 4 and is provided with an outlet at a lower part of a center region thereof. The collecting hopper 7 is provided at the outlet of the collecting chute 6.

Each weighing hopper 4 has the two weighing chambers 4a and 4b. The weighing chambers 4a and 4b are respectively provided with gates which are opened to independently discharge therefrom the objects to be weighed. Each feeding hopper 3 is provided with two gates which are capable of being independently driven. The feeding hopper 3 opens one of the gates to selectively discharge the objects to be weighed into the weighing chamber 4a or the weighing chamber 4b of the weighing hopper 4. Each weighing hopper 4 is attached with the weight sensor 5 such as a load cell to measure the weight of the objects to be weighed inside the weighing hopper 4. The weight sensor 5 sends a measured value to the control unit 10. In each weighing hopper 4, when the objects to be weighed are fed only to one of the weighing chambers, for example, the weighing chamber 4a, the weight sensor 5 measures the weight of the objects to be weighed inside the weighing chamber 4a. When the objects to be weighed are fed to the other weighing chamber 4b, the weight sensor 5 measures the total weight of the objects to be weighed inside the two weighing chambers 4a and 4b. The control unit 10 calculates the weight of the objects to be weighed inside the weighing chamber 4b by subtracting the weight of the objects to be weighed inside the weighing chamber 4a that has been previously measured, from the total weight of the objects to be weighed inside the two weighing chambers 4a and 4b, and performs combination calculation based on the weights of the objects to be weighed inside the weighing chambers 4a and 4b of each weighing hopper 4.

By the combination calculation performed by the control unit 10, weighing chambers forming a combination which have been fed with the objects to be weighed whose total weight falls within an allowable range (predetermined weight range) with respect to a combination target weight are selected from the weighing chambers 4a and 4b of the plurality of weighing hoppers 4, and the total weight of the objects to be weighed inside the weighing chambers 4a and 4b selected to form the combination is determined as combination weight. In a case where there are plural combinations whose total weights fall within the allowable range with respect to the combination target weight, a combination that minimizes a difference between the total weight of the objects to be weighed and the combination target weight is selected.

An operation of the combination weigher configured above will be described.

The objects to be weighed are supplied from the external supplying device to the dispersion feeder 1 and are fed to each linear feeder 2 by vibration of the dispersion feeder 1. The objects to be weighed are further fed to each feeding hopper 3 by vibration of each linear feeder 2. One of the two gates of each feeding hopper 3 is opened and closed to feed the objects to be weighed into one of the weighing chambers 4a and 4b of the weighing hopper 4. Initially, this operation is repeated twice to feed the objects to be weighed to both of the weighing chambers 4a and 4b. The control unit 10 controls the operation of the dispersion feeder 1, the operation of each linear feeder 2, and the opening and closing operations of the two gates of each feeding hopper 3.

After the control unit 10 performs the combination calculation based on the weights of the objects to be weighed inside the weighing chambers 4a and 4b as described above, it causes the weighing chambers 4a and 4b selected to form the combination to open and close the gates, thereby discharging the objects to be weighed from the weighing chambers 4a and 4b. The discharged objects to be weighed slide on the collecting chute 6, pass through the outlet provided at the lower part of the collecting chute 6, and are accumulated in the collecting hopper 7. Furthermore, the control unit 10 causes the collecting hopper 7 to open the gate in response to a feed command signal from, for example, the packaging machine (not shown) disposed below the collecting hopper 7 to send out the objects to be weighed from inside the collecting hopper 7 to the packaging machine.

The collecting hopper 7 may be omitted. Nonetheless, since the objects to be weighed which have been discharged from the weighing chambers 4a and 4b are temporarily accumulated in the collecting hopper 7 and then the objects to be weighed are discharged in a state of gathering together into the packaging machine, the discharge time can be shortened, and the objects to be weighed can be prevented from being stuck at sealed regions of upper and lower ends of a bag manufactured by the packaging machine operated at a high speed.

Figure 2:
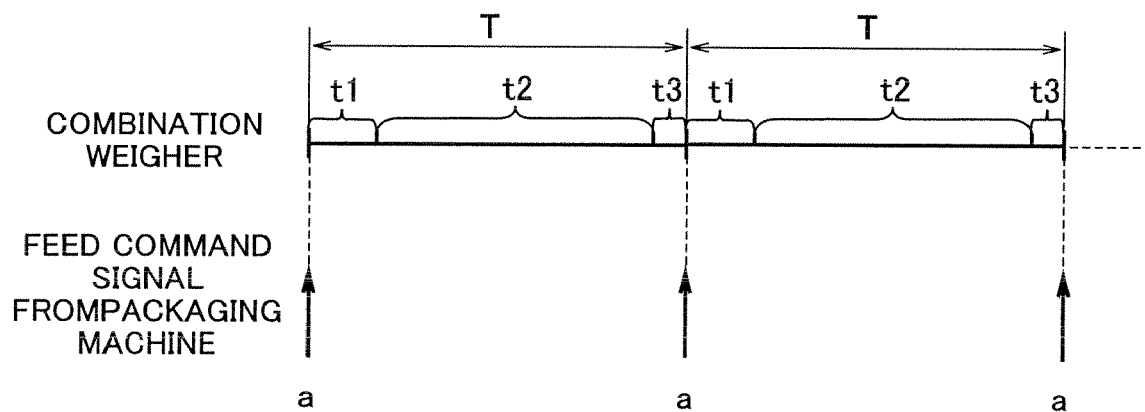
FIG. 2 is a timing chart of an operation of the combination weigher according to the embodiment of the present invention.

FIG. 2 is a timing chart of the operation of the combination weigher according to the embodiment of the present invention. In FIG. 2, T indicates one weighing cycle which is repeated.

Each weighing cycle T consists of a discharge and feed time t1, a stabilization time t2 and a combination time t3. The discharge and feed time t1 is a time taken to open and close the gate of the collecting hopper 7 in response to, for example, a feed command signal a sent from the packaging machine, to open and close the gates of the weighing chambers 4a and 4b selected to form the combination, and to open and close the gates of the feeding hopper 3 operated to feed the objects to be weighed to the weighing chambers 4a and 4b. The stabilization time t2 is a stabilization time of the weight sensor 5 attached to the weighing hopper 4. The combination time t3 is a time taken to perform the combination calculation and the like and may include time for waiting the feed command signal from the packaging machine.

In the discharge and feed time t1 of each weighing cycle T, the gate of the collecting hopper 7 is opened and closed in response to the feed command signal a output from the packaging machine to discharge the objects to be weighed to the packaging machine, the gates of the weighing chambers 4a and 4b selected to form the combination are opened and closed to discharge the objects to be weighed to the collecting hopper 7, and the objects to be weighed which will be discharged in next weighing cycle are accumulated in the collecting hopper 7. Furthermore, the objects to be weighed are fed from the feeding hopper 3 to the weighing chambers 4a and 4b which have discharged the objects to be weighed and thus are empty. Thereafter, in the combination time t3 after an elapse of the stabilization time t2, the combination calculation is performed to determine a combination of the weighing chambers 4a and 4b which will next discharge the objects to be weighed.

Conventionally, there exists a problem that if both of weighing chambers 4a and 4b of a weighing hopper 4 are simultaneously selected to form a combination, the objects to be weighed are fed only to one of the weighing chambers 4a and 4b from the feeding hopper 3 before next combination calculation starts, and thus the other weighing chamber is empty and cannot participate in a combination in next combination calculation, decreasing the number of combinations, which results in reduced weighing precision. Accordingly, in this embodiment, by limiting, to a predetermined number or less, the number of arbitrary weighing hoppers 4 whose weighing chambers 4a and 4b may be both selected simultaneously to form a combination in the combination calculation, the weighing precision is increased.

In order to verify this, a simulation was conducted. The simulation was conducted under conditions in which combination target weight was set to 1000 g, target weight (feed target weight) to be fed from the feeding hopper to each weighing chamber was set to 25% (250 g) of the combination target weight, a standard deviation of the feed weight actually fed from the feeding hopper to each weighing chamber was set to 40% (100 g) of the feed target weight. Under these conditions, the number of weighing chambers that may be selected for one combination is 3 to 6. In the combination calculation carried out in the simulation, weighing chambers forming a combination which have been fed with the objects to be weighed whose total weight was not less than the combination target weight and minimizes a difference with the combination target weight were selected, and the total weight was determined as the combination weight. The objects to be weighed are discharged from the weighing chambers selected to form the combination. In every discharge, the feeding hopper 3 is capable of feeding the objects to be weighed only to one of the two weighing chambers 4a and 4b of the corresponding weighing hopper 4. For example, if both of weighing chambers 4a and 4b of a weighing hopper 4 are simultaneously selected to form a combination in combination calculation, then the objects to be weighed are discharged from these weighing chambers 4a and 4b. In next combination calculation, one of the two weighing chambers 4a and 4b has been fed with the objects to be weighed from the feeding hopper 3 but the other of the two weighing chambers 4a and 4b is empty without the objects to be weighed and thus cannot participate in a combination. Subsequently, if one of the weighing chambers 4a and 4b which has been fed with the objects to be weighed is selected to form a combination, then one of the weighing chambers 4a and 4b is empty and thus cannot participate in a combination in next combination calculation in the same manner.

Under the above set conditions, simulation was conducted with respect to each of combination weighers equipped with four weighing hoppers 4, five weighing hoppers 4, six weighing hoppers 4, seven weighing hoppers 4, eight weighing hoppers 4, and nine weighing hoppers 4 in such a manner that the weighing cycle T was repeated 9999 times, in the cases where the number of weighing hoppers 4 whose weighing chambers 4a and 4b may be both selected simultaneously to form a combination in combination calculation (hereinafter expressed as the number of hoppers 4 whose weighing chambers 4a and 4b may be both selected simultaneously) was limited to zero and one, and the number of hoppers 4 whose weighing chambers 4a and 4b may be both selected simultaneously was not limited. The result is illustrated in FIG. 3. It should be noted that, since the number of the weighing chambers which may be selected in each combination is three to six, the number of the weighing hoppers 4 whose weighing chambers 4a and 4b may be both selected simultaneously to form the combination is three at maximum when the number of hoppers 4 whose weighing chambers 4a and 4b may be both simultaneously selected is not limited.

In FIG. 3, the number of equipped weighing hoppers is the number of weighing hoppers 4 equipped in the combination weigher, and an average weight is an average weight of combination weights found in the combination calculations in respective weighing cycles T. Also, in FIG. 3, with respect to the cases where the number of hoppers 4 whose weighing chambers 4a and 4b may be both simultaneously selected is limited to zero and one, the average weights are subtracted from average weights in the case where the number of hoppers 4 whose weighing chambers 4a and 4b may be both selected simultaneously is not limited and the calculated values are expressed as differences.

As can be seen from the result shown in FIG. 3, in the combination weighers equipped with the four weighing hoppers 4, the five weighing hoppers 4, the six weighing hoppers 4, the seven weighing hoppers 4, the eight weighing hoppers 4, and the nine weighing hoppers 4, the average weights in the case where the number of hoppers whose weighing chambers may be both selected simultaneously is limited to zero are larger than the average weights in the case where the number of hoppers whose weighing chambers may be both selected simultaneously is not limited, whereas the average weights in the case where the number of hoppers whose weighing chambers may be both selected simultaneously is limited to one are equal to or smaller than the average weights in the case where the number of hoppers whose weighing chambers may be both selected simultaneously is not limited. From these results, by limiting the number of hoppers whose weighing chambers may be both selected simultaneously to one, the average weight which is closest to the combination target weight is obtained. Thus, the weighing precision is increased. In the case where the number of hoppers whose weighing chambers 4a and 4b may be both selected simultaneously is not limited, the number of weighing hoppers 4 whose weighing chambers 4a and 4b are both simultaneously selected may be in some cases two or three. In those cases, it is estimated that the weighing precision will be reduced, because the weighing chambers which cannot participate in next combination calculation are more than those in the case where the number of hoppers whose weighing chambers may be both selected simultaneously is limited to one. Furthermore, it is estimated that the weighing precision will also be reduced in the case where the number of hoppers whose weighing chambers may be both selected simultaneously is limited to zero, because combinations are fewer in number.

The dispersion feeder 1, the linear feeders 2, and the feeding hoppers 3 in the combination weigher of this embodiment are not intended to be limited in construction to the above. They may be constructed in other ways depending on the type of the objects to be weighed such as powder or chunks so long as feeding means capable of feeding the objects to be weighed to one of the weighing chambers 4a and 4b of the weighing hopper 4 in every discharge is equipped. Furthermore, as described above, the collecting hopper 7 may be provided as desired. Moreover, the control unit 10 is not limited to being configured as the single control apparatus, but instead may be configured to include a plurality of control apparatuses disposed in a distributed manner, and these control apparatuses may co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The disclosed example of the present invention is useful for increasing weighing precision of a combination weigher comprising a plurality of weighing chambers each including two weighing chambers.

The invention claimed is:

1. A combination weigher comprising:

plurality of weighing hoppers each of which includes two weighing chambers and is capable of weighing objects to be weighed which have been fed to one of the two weighing chambers, the weighing chambers being capable of independently discharging the objects to be weighed;

a plurality of feeding means which are disposed above the weighing hoppers to respectively correspond to the weighing hoppers, for selectively feeding the objects to be weighed to each of the two weighing chambers of a corresponding weighing hopper; and a control means which is configured to perform combination calculation based on weight of the objects to be weighed which have been fed into the weighing chambers of each of the weighing hoppers to select weighing chambers forming a combination which have been fed with the objects to be weighed whose total weight falls within a predetermined weight range, and is configured to cause the selected weighing chambers to discharge therefrom the objects to be weighed;

wherein the control means is configured to perform the combination calculation in such a way that a number of the weighing hoppers from which both weighing chambers are selected simultaneously to form the combination is limited to one or less;

wherein when the combination calculation and the discharging of the objects to be weighed are repeated, each of the feeding means is configured to feed the objects to be weighed to only one of the two weighing chambers of the corresponding weighing hopper in a time period from a current performed combination calculation to a subsequent performed combination calculation.

* * * * *